(12) United States Patent
Zheng et al.

(10) Patent No.: US 9,862,029 B2
(45) Date of Patent: Jan. 9, 2018

(54) METHODS OF MAKING METAL MATRIX COMPOSITE AND ALLOY ARTICLES

(71) Applicant: Kennametal Inc., Latrobe, PA (US)

(72) Inventors: Qingjun Zheng, Export, PA (US);
Yixiong Liu, Greensburg, PA (US);
James A Faust, New Albany, IN (US);
Mark J Rowe, New Derry, PA (US);
Danie J De Wet, Belleville (CA);
Sudharsan Subbaiyan, Belleville (CA);
Michael J Meyer, Irwin, PA (US)

(73) Assignee: KENNAMETAL INC, Latrobe, PA (US)

( * ) Notice: Subject to any disclaimer, the term of this patent is extended or adjusted under 35 U.S.C. 154(b) by 618 days.

(21) Appl. No.: 13/832,635

(22) Filed: Mar. 15, 2013

(65) Prior Publication Data

US 2014/0271318 A1    Sep. 18, 2014

(51) Int. Cl.
*B22F 7/00* (2006.01)
*B22D 23/06* (2006.01)
(Continued)

(52) U.S. Cl.
CPC .............. *B22F 7/008* (2013.01); *B22D 23/06* (2013.01); *B22F 5/106* (2013.01);
(Continued)

(58) Field of Classification Search
CPC .......... B22D 23/06; B22F 7/008; B22F 5/106; C22C 1/1015; C22C 29/02
See application file for complete search history.

(56) References Cited

U.S. PATENT DOCUMENTS

| 3,005,795 A | 10/1961 | Busse et al. |
| 3,024,128 A | 3/1962 | Dawson |

(Continued)

FOREIGN PATENT DOCUMENTS

| CN | 101994114 A | 3/2011 |
| CN | 102922168 A | 2/2013 |

(Continued)

OTHER PUBLICATIONS

ASM Manual "Hot Isostatic Pressing of Metal Powders", J.J. Conway et al, vol. 7 p. 1424-1425, 1998.*

(Continued)

*Primary Examiner* — Jessee Roe
*Assistant Examiner* — Christopher Kessler
(74) *Attorney, Agent, or Firm* — Larry R. Meenan

(57) ABSTRACT

In one aspect, methods of making freestanding metal matrix composite articles and alloy articles are described. A method of making a freestanding composite article described herein comprises disposing over a surface of the temporary substrate a layered assembly comprising a layer of infiltration metal or alloy and a hard particle layer formed of a flexible sheet comprising organic binder and the hard particles. The layered assembly is heated to infiltrate the hard particle layer with metal or alloy providing a metal matrix composite, and the metal matrix composite is separated from the temporary substrate. Further, a method of making a freestanding alloy article described herein comprises disposing over the surface of a temporary substrate a flexible sheet comprising organic binder and powder alloy and heating the sheet to provide a sintered alloy article. The sintered alloy article is then separated from the temporary substrate.

15 Claims, 2 Drawing Sheets

(51) Int. Cl.

| | |
|---|---|
| *B22F 5/10* | (2006.01) |
| *C22C 1/10* | (2006.01) |
| *C22C 29/02* | (2006.01) |
| *C22C 32/00* | (2006.01) |
| *B23K 35/30* | (2006.01) |
| *B23K 35/02* | (2006.01) |
| *B22F 7/06* | (2006.01) |

(52) U.S. Cl.
CPC ...... *B23K 35/0222* (2013.01); *B23K 35/0244* (2013.01); *B23K 35/304* (2013.01); *B23K 35/3033* (2013.01); *C22C 1/1015* (2013.01); *C22C 29/02* (2013.01); *C22C 32/0047* (2013.01); *B22F 2005/103* (2013.01); *B22F 2007/066* (2013.01)

(56) References Cited

U.S. PATENT DOCUMENTS

| | | | |
|---|---|---|---|
| 3,281,511 A | 10/1966 | Goldsmith | |
| 3,533,930 A | 10/1970 | Lawton et al. | |
| 3,541,070 A | 11/1970 | Ahrabi | |
| 3,556,161 A | 1/1971 | Roberts | |
| 3,677,853 A | 7/1972 | Anzelone, Jr. et al. | |
| 3,743,556 A | 7/1973 | Breton et al. | |
| 3,778,586 A | 12/1973 | Breton et al. | |
| 3,838,092 A | 9/1974 | Vogt et al. | |
| 3,853,690 A | 12/1974 | McGarry et al. | |
| 3,864,124 A | 2/1975 | Breton et al. | |
| 3,876,447 A | 4/1975 | Lally | |
| 3,916,506 A | 11/1975 | Wolf | |
| 3,988,405 A | 10/1976 | Smith et al. | |
| 4,000,781 A | 1/1977 | Knapp | |
| 4,073,639 A | 2/1978 | Duvall | |
| 4,102,399 A | 7/1978 | Harnsberger | |
| 4,194,040 A | 3/1980 | Breton et al. | |
| 4,242,842 A | 1/1981 | Yancey | |
| 4,381,944 A | 5/1983 | Smith, Jr. | |
| 4,478,871 A | 10/1984 | Sakaguchi et al. | |
| 4,493,451 A | 1/1985 | Clark | |
| 4,544,377 A | 10/1985 | Schwen | |
| 4,596,691 A | 6/1986 | Ruppert et al. | |
| 4,596,746 A | 6/1986 | Morishita et al. | |
| 4,614,296 A | 9/1986 | Lesgourgues | |
| 4,830,934 A | 5/1989 | Ferrigno | |
| 4,884,477 A | 12/1989 | Smith et al. | |
| 4,910,098 A | 3/1990 | Lee | |
| 4,919,013 A | 4/1990 | Smith et al. | |
| 4,939,101 A | 7/1990 | Black et al. | |
| 4,940,566 A | 7/1990 | Wood | |
| 4,966,748 A | 10/1990 | Miyasaka et al. | |
| 5,070,591 A | 12/1991 | Quick et al. | |
| 5,147,460 A | 9/1992 | Otaki | |
| 5,156,321 A | 10/1992 | Liburdi | |
| 5,161,728 A | 11/1992 | Li | |
| 5,164,247 A | 11/1992 | Solanki et al. | |
| 5,236,116 A | 8/1993 | Solanki et al. | |
| 5,238,881 A | 8/1993 | Norris | |
| 5,240,491 A | 8/1993 | Budinger | |
| 5,271,547 A | 12/1993 | Carlson | |
| 5,348,215 A | 9/1994 | Rafferty | |
| 5,352,526 A | 10/1994 | Solanki et al. | |
| 5,441,762 A | 8/1995 | Gray et al. | |
| 5,492,550 A | 2/1996 | Krishnan et al. | |
| 5,523,169 A | 6/1996 | Rafferty | |
| 5,523,170 A | 6/1996 | Budinger | |
| 5,593,726 A * | 1/1997 | Nicholls et al. | 427/189 |
| 5,641,921 A | 6/1997 | Dennis et al. | |
| 5,660,320 A | 8/1997 | Hoffmuller et al. | |
| 5,743,033 A | 4/1998 | Gegel | |
| 5,868,819 A | 2/1999 | Guhde et al. | |
| 5,952,042 A | 9/1999 | Rafferty | |
| 6,073,518 A | 6/2000 | Chow et al. | |
| 6,103,186 A | 8/2000 | Sievers et al. | |
| 6,113,730 A | 9/2000 | Ohya et al. | |
| 6,171,709 B1 | 1/2001 | Koizumi et al. | |
| 6,649,682 B1 | 11/2003 | Breton et al. | |
| 6,749,894 B2 | 6/2004 | Subramanian et al. | |
| 7,017,793 B2 | 3/2006 | Kinstler | |
| 7,115,679 B2 | 10/2006 | Ellison | |
| 7,198,209 B2 | 4/2007 | Herbst | |
| 7,250,123 B2 | 7/2007 | Fujioka et al. | |
| 7,326,892 B1 | 2/2008 | Cretegny | |
| 7,661,491 B2 | 2/2010 | Kembaiyan et al. | |
| 7,789,288 B1 | 9/2010 | Johnson | |
| 7,968,218 B2 | 6/2011 | Pitonak et al. | |
| 8,034,154 B2 | 10/2011 | Singer | |
| 8,087,565 B2 | 1/2012 | Kottilingam | |
| 8,273,148 B2 | 9/2012 | Minor | |
| 8,808,870 B2 | 8/2014 | Zheng et al. | |
| 2004/0191064 A1 | 9/2004 | Guo | |
| 2004/0234820 A1 | 11/2004 | Majagi | |
| 2006/0134455 A1 | 6/2006 | Belhadjhamida et al. | |
| 2007/0141375 A1 | 6/2007 | Budinger et al. | |
| 2007/0224349 A1 | 9/2007 | Hosenfeldt et al. | |
| 2009/0084895 A1 | 4/2009 | Holwerk | |
| 2009/0123268 A1 | 5/2009 | Brittingham et al. | |
| 2009/0139607 A1 | 6/2009 | Kool | |
| 2009/0255714 A1 | 10/2009 | Sohn et al. | |
| 2010/0215983 A1 | 8/2010 | Patel et al. | |
| 2010/0261419 A1 * | 10/2010 | Sung | 451/443 |
| 2011/0067796 A1 | 3/2011 | Belhadjhamida et al. | |
| 2011/0070119 A1 | 3/2011 | Belhadjhamida et al. | |
| 2012/0077058 A1 * | 3/2012 | Ding | 428/634 |
| 2013/0149552 A1 | 6/2013 | Yao et al. | |
| 2013/0344344 A1 | 12/2013 | Gastor et al. | |
| 2014/0057124 A1 | 2/2014 | Komolwit et al. | |
| 2014/0212681 A1 | 7/2014 | Cui | |

FOREIGN PATENT DOCUMENTS

| | | |
|---|---|---|
| DE | 10016830 A1 | 7/2001 |
| EP | 0152263 A2 | 8/1985 |
| EP | 0152263 A3 | 8/1985 |
| JP | 60077962 | 5/1985 |
| JP | 3070658 | 5/2000 |
| JP | 2011166040 A | 8/2011 |
| WO | WO1994011139 A1 | 5/1994 |

OTHER PUBLICATIONS

International Preliminary Search Report—PCT/US2014/022947.
German, Randall M., Powder Metallurgy and Particulate Materials Processing, The Processes, Materials, Products, Properties, and Applications, Metal Powder Industries Federation, Copyright 2005, ISBN: 0-9762057-1-8, pp. 227-231.
EP 147693485, 2015-10-28 EPO Notification R161(1) & R.162 EP 147693485.
Jan. 25, 2016 Notice of Allowance K-04253-US-NP.
Sulzer, Material Product Data Sheet.
K.J. Pallos, Gas Turbine Repair Technology.
Xiao Huang et al., Wide Gap Braze Repair of Gas Turbine Blades and Vanes.
Jul. 7, 2015 Office action (3 months) 1 20140271319.
Search Report and Written Opinion date: Jun. 20, 2014.
Nov. 24, 2016 EPO Notification R70a(2)&R70(2).
Aug. 12, 2016 Office action (3 months) 1.
Sep. 14, 2016 EPO Notification R64/164.
ASM International, Powder Metal Technologies and Applications, vol. 7, ASM Handbook, Copyright 1998, pp. 972-975, ISBN: 0-87170-387-4.
Nov. 7, 2016 EPO Communication/Search Report, K-2770 EP, 14769348.5, 26 pages.
Feb. 13, 2017 Final Office Action.

\* cited by examiner

METHODS OF MAKING METAL MATRIX COMPOSITE AND ALLOY ARTICLES

FIELD

The present invention relates to methods of making metal matrix composite and alloy articles and, in particular, to freestanding metal matrix composite and alloy articles having complex geometry, thin wall structure and/or thin cross-section.

BACKGROUND

Fabrication of hard alloy or metal matrix composite articles is always challenging since brittleness typically increases with increasing hardness. Fabrication of hard alloy or metal matrix composite articles having complex geometry, thin wall thickness or thin cross-section is particularly challenging. Fabrication techniques such as pre-forming by powder pressing, extrusion or injection molding followed by sintering are often employed for making such articles. However, given the limitations of tooling and dies, articles produced according to these methods are usually not near-net shape, necessitating additional significant green shaping, machining and processing.

Moreover, casting can be used for making articles of complex geometry and thick wall structure. Nevertheless, casting is mainly limited to a subset of metal and alloy systems suitable for such operations. For hard alloys and metal matrix composites, casting can be difficult. Further, mechanical working, such as hot rolling, is sometimes employed for making thin metal or alloy sheets. Hard alloys and metal matrix composites are generally unsuitable for hot rolling due to the high hardness exhibited by these materials rendering them brittle and prone to crack formation during the working process. In view of these deficiencies, new methods of producing hard alloy and metal matrix composite articles, including articles of complex geometry, thin wall structure or thin cross-section, are required.

SUMMARY

In one aspect, methods of making freestanding metal matrix composite articles are described herein which, in some embodiments, can offer advantages over prior methods. Advantages of methods described herein can be fully exploited when fabricating metal matrix composite articles and alloy articles of complex geometry, thin wall thickness and/or thin cross-section. A method of making a freestanding composite article described herein comprises providing a temporary substrate and disposing over a surface of the temporary substrate a layered assembly comprising a layer of infiltration metal or alloy and a hard particle layer formed of a sheet comprising organic binder and the hard particles. The layered assembly is heated to infiltrate the hard particle layer with the metal or alloy providing a metal matrix composite, and the metal matrix composite is separated from the temporary substrate. Infiltration alloy, in some embodiments, comprises nickel-based alloy, cobalt-based alloy, copper-based alloy, iron-based alloy, aluminum-based alloy or titanium-based alloy. Further, in some embodiments, infiltration metal or alloy is added to the sheet comprising organic binder and the hard particles and, therefore, is not provided as a separate layer in the assembly.

In another aspect, methods of making freestanding metallic articles are described herein. The freestanding metallic articles can be of complex geometry, thin wall structure and/or thin cross-section. A method of making a freestanding metallic article comprises providing a temporary substrate and disposing over a surface of the temporary substrate a sheet comprising organic binder and powder metal or powder alloy. The sheet of organic binder and powder metal or powder alloy is heated to provide a sintered metal or sintered alloy article, and the sintered metal or sintered alloy article is separated from the temporary substrate.

These and other embodiments are described in greater detail in the detailed description which follows.

DETAILED DESCRIPTION

Figure 1:
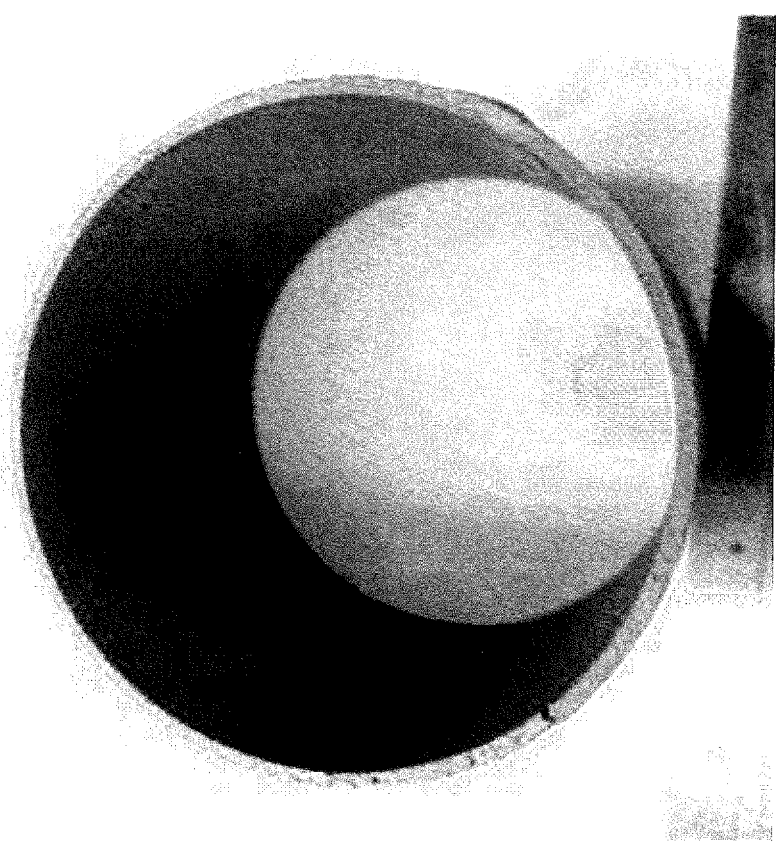
FIG. 1 illustrates a freestanding metal matrix composite article produced according to one embodiment of a method described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Methods of Making Freestanding Composite Articles

A method of making a freestanding composite article described herein comprises providing a temporary substrate and disposing over a surface of the temporary substrate a layered assembly comprising a layer of infiltration metal or alloy and a hard particle layer formed of a sheet comprising organic binder and the hard particles. The layered assembly is heated to infiltrate the hard particle layer with the metal or alloy providing a metal matrix composite, and the metal matrix composite is separated from the temporary substrate.

Turning now to specific steps, methods described herein comprise providing a temporary substrate and disposing over a surface of the temporary substrate a layered assembly comprising a layer of infiltration metal or alloy and a hard particle layer formed of a sheet comprising organic binder and the hard particles. A temporary substrate can comprise any material not inconsistent with the objectives of the present invention. In some embodiments, a temporary substrate is formed of a material substantially inert to the metal or alloy infiltrating the hard particle layer. A temporary substrate can also be coated with a material substantially inert to the metal or alloy infiltrating the hard particle layer. Materials substantially inert to molten infiltration metal or alloy, in some embodiments, comprise one or more ceramic or refractory materials including hexagonal boron nitride, alumina, silica, silicon carbide, zirconia, magnesium oxide, graphite coated with hexagonal boron nitride, other ceramics or combinations thereof. Additional materials substantially inert to molten infiltration metal or alloy can comprise graphite or alloys of various compositions having limited reactivity with the infiltration metal or alloy.

In being substantially inert to infiltration metal or alloy, a temporary substrate can be reusable. Alternatively, a temporary substrate can be consumed in the fabrication of the composite article. In some embodiments, for example, the temporary substrate is not inert to the infiltration metal or alloy and bonds with the composite article. In such embodiments, the temporary substrate can be machined away or otherwise sacrificed to provide the freestanding composite article.

The temporary substrate can have any shape and/or dimension for providing freestanding composite articles of desired shape and dimension. In some embodiments, the temporary substrate is a die or mold providing freestanding composite articles of complex geometries, shapes and/or contours. For example, the temporary substrate can provide a freestanding composite article curved surface(s), planar surface(s) and/or polygonal geometries. In some embodiments, the temporary substrate is a die or mold reflecting the final shape or near-final shape of the freestanding composite article and facilitates providing the freestanding composite article in near-net shape form upon separation of the article from the temporary substrate. For example, in some embodiments, a freestanding composite article is a wear pad, and the temporary substrate is of shape and dimension to provide the wear pad in near-net shape form upon separation from the substrate, thereby obviating or reducing further processing steps.

Further, in some embodiments, a substrate is provided in an array format comprising a one or two-dimensional array of dies or molds for fabricating freestanding composite articles. Arrayed substrates can further enhance production efficiencies realized herein by permitting the fabrication of a plurality of freestanding composite articles in a single fabrication cycle. In one embodiment, for example, a substrate is provided in a tray format having a two-dimensional array of dies or molds suitable for wear pad fabrication.

As described herein, a layered assembly is disposed over a surface of the temporary substrate, the layered assembly comprising a layer of infiltration metal or alloy and a hard particle layer formed of a sheet comprising organic binder and the hard particles. The sheet can be flexible and cloth-like in nature. Organic binder of the sheet, for example, can comprise one or more polymeric materials. Suitable polymeric materials for use in the flexible sheet can comprise one or more fluoropolymers including, but not limited to, polytetrafluoroethylene (PTFE).

Suitable hard particles carried by the sheet can comprise particles of metal carbides, metal nitrides, metal carbonitrides, metal borides, metal silicides, cemented carbides, cast carbides, other ceramics, intermetallics or mixtures thereof. In some embodiments, metallic elements of hard particles comprise aluminum, boron, silicon and/or one or more metallic elements selected from Groups IIB, IIIB, IVB, VB, and VIB of the Periodic Table. Groups of the Periodic Table described herein are identified according to the CAS designation.

In some embodiments, for example, hard particles comprise carbides of tungsten, titanium, chromium, molybdenum, zirconium, hafnium, tanatalum, niobium, rhenium, vanadium, boron or silicon or mixtures thereof. Hard particles, in some embodiments, comprise nitrides of aluminum, boron, silicon, titanium, zirconium, hafnium, tantalum or niobium or mixtures thereof. Additionally, in some embodiments, hard particles comprise borides such as titanium di-boride, $B_4C$ or tantalum borides or suicides such as $MoSi_2$ or $Al_2O_3$—SiN. Hard particles can comprise crushed cemented carbide, crushed carbide, crushed nitride, crushed boride, crushed silicide, ceramic particle reinforced metal matrix composite, silicon carbide metal matrix composites or combinations thereof. Crushed cemented carbide particles, for example, can have 0.1 to 25 weight percent metallic binder. Additionally, hard particles can comprise intermetallic compounds such as nickel aluminide.

Hard particles can have any size not inconsistent with the objectives of the present invention. In some embodiments, hard particles have a size distribution ranging from about 0.1 μm to about 2 mm. Hard particles can also demonstrate bimodal or multi-modal size distributions. Hard particles can also have any desired shape or geometry. In some embodiments, hard particles have spherical, elliptical or polygonal geometry. Hard particles, in some embodiments, have irregular shapes, including shapes with sharp edges.

Hard particles can be present in the sheet in an amount sufficient to provide the resulting freestanding metal matrix composite a hard particle content of about 20 vol. % to 90 vol. %. In some embodiments, hard particles are present in the sheet in an amount sufficient to provide the resulting freestanding metal matrix composite a hard particle content of about 30 vol. % to 85 vol. %. Moreover, hard particles can be present in the sheet in an amount sufficient to provide the resulting freestanding metal matrix composite a hard particle content of about 40 vol. % to 70 vol. %.

Hard particles are combined with the organic binder to fabricate the sheet carrying the hard particles. The organic binder and hard particles are mechanically worked or processed to trap the hard particles in the organic binder. In one embodiment, for example, hard particles are mixed with 3-15 vol. % PTFE and mechanically worked to fibrillate the PTFE and trap the hard particles. Mechanical working can include spinning, rolling, ball milling, stretching, elongating, spreading or combinations thereof. In some embodiments, the flexible sheet comprising the hard particles is subjected to cold isostatic pressing. In some embodiments, the sheet comprising organic binder and the hard particles is produced in accordance with the disclosure of one or more of U.S. Pat. Nos. 3,743,556, 3,864,124, 3,916,506, 4,194,040 and 5,352,526, each of which is incorporated herein by reference in its entirety.

The layer of infiltration metal or alloy can comprise any metal or alloy not inconsistent with the objectives of the present invention. Suitable infiltration alloy, for example, can be braze alloy having a melting point lower than that of the hard particles and having compositional parameters for wetting and bonding to the hard particles while not wetting and/or not substantially interacting with the temporary substrate. Infiltration alloy, for example, can comprise nickel-based alloys, cobalt-based alloys, copper-based alloys, iron-based alloys, aluminum-based alloys or titanium-based alloys. Suitable nickel-based infiltration alloy can have compositional parameters derived from Table I.

TABLE I

Nickel-based infiltration alloys

| Element | Amount (wt. %) |
|---|---|
| Chromium | 0-30 |
| Molybdenum | 0-5 |
| Niobium | 0-5 |
| Tantalum | 0-5 |
| Tungsten | 0-20 |
| Iron | 0-6 |
| Carbon | 0-5 |
| Silicon | 0-15 |
| Phosphorus | 0-12 |
| Aluminum | 0-1 |
| Copper | 0-50 |
| Boron | 0-6 |
| Nickel | Balance |

In some embodiments, nickel-based infiltration alloy can have a composition selected from Table II.

TABLE II

Nickel-based infiltration alloys

| Ni-Based Alloy | Compositional Parameters (wt. %) |
|---|---|
| 1 | Ni—(13.5-16)%Cr—(2-5)%B—(0-0.1)%C |
| 2 | Ni—(13-15)%Cr—(3-6)%Si—(3-6)%Fe—(2-4)%B—C |
| 3 | Ni—(3-6)%Si—(2-5)%B—C |
| 4 | Ni—(13-15)%Cr—(9-11)%P—C |
| 5 | Ni—(23-27)%Cr—(9-11)%P |
| 6 | Ni—(17-21)%Cr—(9-11)%Si—C |
| 7 | Ni—(20-24)%Cr—(5-7.5)%Si—(3-6)%P |
| 8 | Ni—(13-17)%Cr—(6-10)%Si |
| 9 | Ni—(15-19)%Cr—(7-11)%Si—)—(0.05-0.2)%B |
| 10 | Ni—(5-9)%Cr—(4-6)%P—(46-54)%Cu |
| 11 | Ni—(4-6)%Cr—(62-68)%Cu—(2.5-4.5)%P |
| 12 | Ni—(13-15)%Cr—(2.75-3.5)%B—(4.5-5.0)%Si—(4.5-5.0)%Fe—(0.6-0.9)%C |
| 13 | Ni—(18.6-19.5)%Cr—(9.7-10.5)%Si |
| 14 | Ni—(8-10)%Cr—(1.5-2.5)%B—(3-4)%Si—(2-3)%Fe |
| 15 | Ni—(5.5-8.5)%Cr—(2.5-3.5)%B—(4-5)%Si—(2.5-4)%Fe |

Moreover, cobalt-based infiltration alloy can comprise additive elements of chromium, nickel, boron, silicon, tungsten, carbon, phosphorus as well as other elements. In some embodiments, cobalt-based infiltration alloy has compositional parameters of Co-(15-19) % Ni-(17-21) % Cr-(2-6) % W-(6-10) % Si-(0.5-1.2) % B-(0.2-0.6) % C. In another embodiment, cobalt-based infiltration alloy has compositional parameters of Co-(8-15) % Si or Co-(3.5-4.5) % B. Cobalt-based infiltration alloy can have a composition of Co-(9-13) % P. Further, cobalt-based infiltration alloys can have compositions falling within commercially available cobalt-based alloy under STELLITE® and/or HAYNES® trade designations.

Copper-based infiltration alloy can comprise additive elements of nickel (0-50%), manganese (0-30%), zinc (0-45%), aluminum (0-10%), silicon (0-5%), iron (0-5%) as well as other elements including phosphorous, chromium, beryllium, titanium, boron, tin and/or lead. In some embodiments, Cu-based infiltration alloy can have a composition selected from Table III.

TABLE III

Cu-based infiltration alloy

| Cu-Based Alloy | Compositional Parameters (wt. %) |
|---|---|
| 1 | Cu—(18-27)%Ni—(18-27)%Mn |
| 2 | Cu—(8-12)%Ni |
| 3 | Cu—(29-32)% Ni—(1.7-2.3)% Fe—(1.5-2.5)% Mn |
| 4 | Cu—(2.8-4.0)%Si—1.5%Mn—1.0%Zn—1.0%Sn—Fe—Pb |
| 5 | Cu—(7.0-8.5)Al—(11-14)%Mn—2-4)%Fe—(1.5-3.0)%Ni |

Iron-based infiltration alloy can comprise 0.2-6 wt. % carbon, 0-5 wt. % chromium, 0-37 wt. % manganese, 0-16 wt. % molybdenum and the balance iron. In some embodiments, sintered iron-based alloy cladding has a composition according to Table IV.

TABLE IV

Iron-based infiltration alloy

| Fe-Based Alloy | Compositional Parameters (wt. %) |
|---|---|
| 1 | Fe—(2-6)%C |
| 2 | Fe—(2-6)%C—(0-5)%Cr—(28-37)%Mn |
| 3 | Fe—(2-6)%C—(0.1-5)%Cr |
| 4 | Fe—(2-6)%C—(0-37)%Mn—(8-16)%Mo |

Additionally, aluminum-based infiltration alloys can be employed. Aluminum-based infiltration alloys can comprise alloying elements of copper, magnesium, manganese, silicon, tin, chromium, zirconium, lithium and/or other elements. Aluminum-based alloy can have compositional parameters falling within casting aluminum alloys designated from 1xx.x to 9xx.x, for example, 2xx.x alloys in which copper is the principal alloying element. Aluminum-based alloy can also have a composition falling within wrought aluminum alloys designated from 1xxx to 9xxx.

Further, suitable titanium-based infiltration alloys can have compositional parameters derived from Table V.

TABLE V

Titanium-based infiltration alloy

| Element | Amount (wt. %) |
|---|---|
| Zirconium | 0-40 |
| Copper | 0-20 |
| Nickel | 0-25 |
| Molybdenum | 0-2 |
| Titanium | Balance |

In some embodiments, titanium-based infiltration alloy is selected from Table VI.

TABLE VI

Titanium-based Infiltration Alloy

| Ti-Based Alloy | Compositional Parameters (wt. %) |
|---|---|
| 1 | Ti—37.5%Zr—15%Cu—10%Ni |
| 2 | Ti—37.5%Zr—15%Cu—10%Ni—1%Mo |
| 3 | Ti—24%Zr—16%Cu—16%Ni—0.5%Mo |
| 4 | Ti—26%Zr—14%Cu—14%Ni—0.5%Mo |
| 5 | Ti—(18-22)%Zr—(18-22)%Cu—(18-22)%Ni |
| 6 | Ti—(18-22)%Zr—(18-22)%Cu—(18-22)%Ni—1%Mo |
| 7 | Ti—15%Cu—25%Ni |

Infiltration metal or alloy can be provided to the layered assembly as a metal or alloy sheet or foil. Alternatively, infiltration metal or alloy can be provided as metal or alloy chunk(s) or block(s). Further, infiltration metal or alloy can be provided in powder form and carried by an additional sheet comprising organic binder of the layered assembly. Powder infiltration metal or alloy carried by an additional sheet can have any particle size not inconsistent with the objectives of the present invention. In some embodiments, powder infiltration metal or alloy has an average particle size less than 200 µm. For example, in one embodiment, powder infiltration metal or alloy has an average particle size less than 55 µm. Further, powder infiltration metal or alloy carried by the sheet can demonstrate bi-modal or multi-modal size distributions. Powder infiltration metal or alloy can be combined with organic binder in the fabrication of a cloth-like sheet as described above.

After positioning over a surface of the temporary substrate, the layered assembly is heated to infiltrate the hard particle layer with the infiltration metal or alloy providing a metal matrix composite. In some embodiments, for example, the temporary substrate, hard particles and infiltration metal or alloy of the layered assembly are heated to a temperature above the melting point of the infiltration metal or alloy permitting the metal or alloy to penetrate and/or infiltrate the hard particle layer forming the metal matrix composite. Organic binder of sheet(s) in the layered assembly is burned off or otherwise decomposed during the heating process. The temporary substrate and layered assembly can be heated in vacuum or under inert or reducing atmosphere to a temperature and for a time period sufficient for the metal or alloy to penetrate and/or infiltrate the hard particle layer forming a fully dense or substantially fully dense metal matrix composite.

The metal matrix composite is cooled for solidification of the infiltration metal or alloy and subsequently removed from the substrate. As described herein, metal or alloy infiltrating the hard particle layer, in some embodiments, does not substantially interact with the temporary substrate facilitating separation of the metal matrix composite from the temporary substrate. The lack of interaction or reactivity between the infiltration metal or alloy and the substrate can also render the substrate reusable. Further, the metal matrix composite can be in near-net shape form when removed from the temporary substrate.

In some embodiments powder infiltration metal or alloy of the assembly is carried by the sheet comprising the hard particles. In such embodiments, powder infiltration metal or alloy and hard particles are combined with the organic binder and worked into a cloth-like sheet as described herein. The assembly including the sheet comprising organic binder, powder infiltration metal or alloy and hard particles is disposed over the substrate surface and heated to melt or partially melt the infiltration powder metal or alloy providing the composite article of hard particles disposed in matrix metal or matrix alloy. Upon cooling, the composite article is separated from the substrate. Freestanding composite articles produced according to methods described herein can be fully dense or substantially fully dense. For example, infiltration of the hard particle layer with molten metal or alloy provides a fully dense or substantially fully dense metal matrix composite. In contrast to prior techniques including pre-forming by powder pressing, extrusion or injection molding followed by sintering, freestanding composite articles produced according to methods described herein are not limited by constraints such as minimum thickness, maximum lateral dimension(s) and/or geometry. In some embodiments, for example, a freestanding composite article having a thickness or wall thickness less than 0.5 mm can be produced without significant green shaping or post-sintering machining as is required for such an article formed by processes employing pre-forming steps of powder pressing, extrusion or molding.

Further, a near net-shape freestanding composite article having at least one lateral dimension in excess of 500 mm or in excess of 1000 mm can be produced easily according to methods described herein. Such large sizes often present complications in pre-forming of pressing, extrusion or injection molding thereby necessitating significant pre-forming shaping and/or post-sintering machining operations. Production of near-net shape freestanding composite articles described herein, in some embodiments, is facilitated by shaping the flexible sheet comprising the organic binder and the hard particles. The flexible sheet, for example, can be subjected to shape-forming operation(s) wherein the sheet is provided a shape or form reflecting the net shape and size of the free-standing composite article. Shape-forming operations can include, but are not limited to, drawing, die cutting, stamping and punching.

Freestanding composite articles produced according to methods described herein can demonstrate desirable wear, abrasion, erosion and/or corrosion properties as well as desirable mechanical properties. In some embodiments, a freestanding composite article displays an average volume loss (AVL) less than 20 mm$^3$ according to ASTM G65 Standard Test Method for Measuring Abrasion using the Dry Sand/Rubber Wheel, Procedure A. In some embodiments, a freestanding composite article displays an AVL according to Table VII.

TABLE VII

| AVL of freestanding composite article |
|---|
| AVL of Freestanding Composite Article* (mm$^3$) |
| ≤20 |
| ≤12 |
| ≤10 |
| ≤8 |
| ≤6 |
| 2-20 |
| 3-12 |

*ASTM G65 Standard Test Method for Measuring Abrasion Using the Dry Sand/Rubber Wheel, Procedure A Additionally, in some embodiments, a freestanding composite article produced according to methods described herein can demonstrate an erosion rate of less than 0.05 mm$^3$/g at a particle impingement angle of 90° according to ASTM G76-07—Standard Test Method for Conducting Erosion Tests by Solid Particle Impingement Using Gas Jets. A freestanding composite article, in some embodiments, displays an erosion rate less than 0.04 mm$^3$/g, less than 0.03 mm$^3$/g or less than 0.02 mm$^3$/g at a particle impingement angle of 90° according to ASTM G76-07.

In some embodiments, wear, abrasion, erosion and/or corrosion properties of a freestanding composite article described herein can be enhanced by application of a refractory coating by chemical vapor deposition (CVD), physical vapor deposition (PVD), thermal spray or combinations thereof. For example, a freestanding composite article can be coated with diamond, diamond-like carbon or ceramic material(s) by CVD. Additionally, a freestanding composite article can be coated with a metal or alloy of lower melting point than the composite article. Such a metal or alloy coating can be operable for brazing the freestanding composite article to one or more structural components. Alternatively, a freestanding composite article described herein can be coated with epoxy or other organic material for bonding with other structural components.

II. Methods of Making Freestanding Metallic Articles

In another aspect, methods of making freestanding metallic articles are described herein. A method of making a freestanding metallic article comprises providing a temporary substrate and disposing over a surface of the temporary substrate a sheet comprising organic binder and powder metal or powder alloy. The sheet of organic binder and powder metal or powder alloy is heated to provide a sintered metal or sintered alloy article, and the sintered metal or sintered alloy article is separated from the temporary substrate.

Turning now to specific steps, a method of making a metallic article comprises providing a temporary substrate and disposing over a surface of the temporary substrate a sheet comprising organic binder and powder metal or powder alloy. Suitable temporary substrates can comprise any temporary substrate described in Section I herein. In some embodiments, for example, the temporary substrate is a mold or die formed of or coated with a material substantially inert to the powder metal or powder alloy during sintering operations described further herein. For example, materials substantially inert to the powder metal or powder alloy under sintering operations can comprise one or more refractory materials including hexagonal boron nitride, alumina, silica, silicon carbide, zirconia, magnesium oxide, graphite coated with hexagonal boron nitride, other ceramics or combinations thereof. Additional materials substantially inert to the powder metal or alloy under sintering conditions can comprise graphite or alloys of various composition having limited reactivity with the sintered metal or alloy, such as high temperature tungsten-based alloys, molybdenum-based alloys and chromium-based alloys. In being substantially inert to the powder metal or powder alloy during sintering operations, the temporary substrate can be reusable. Additionally, the temporary substrate can have any shape and/or dimension for providing freestanding metallic articles of desired shape and dimension.

A sheet comprising organic binder and powder metal or powder alloy is disposed over the substrate. As described in Section I, the sheet can be cloth-like and flexible in nature. In some embodiments, organic binder of the sheet comprises one or more polymeric materials. Suitable polymeric materials for use in the sheet can include one or more fluoropolymers including, but not limited to, polytetrafluoroethylene (PTFE).

Powder alloy carried by the sheet can be selected to produce freestanding articles of sintered nickel-based alloy or sintered cobalt-based alloy. Sintered nickel-based alloy articles can have compositional parameters derived from Table VIII.

TABLE VIII

Nickel-based sintered alloy

| Element | Amount (wt. %) |
|---|---|
| Chromium | 0-30 |
| Molybdenum | 0-28 |
| Niobium | 0-6 |
| Tantalum | 0-6 |
| Cobalt | 0-15 |
| Tungsten | 0-15 |
| Iron | 0-50 |
| Carbon | 0-5 |

TABLE VIII-continued

Nickel-based sintered alloy

| Element | Amount (wt. %) |
|---|---|
| Manganese | 0-2 |
| Silicon | 0-10 |
| Titanium | 0-6 |
| Aluminum | 0-1 |
| Copper | 0-50 |
| Boron | 0-5 |
| Phosphorus | 0-10 |
| Nickel | Balance |

In some embodiments, for example, a sintered nickel-based alloy article comprises 18-23 wt. % chromium, 5-11 wt. % molybdenum, 2-5 wt. % total of niobium and tantalum, 0-5 wt. % iron, 0-5 wt. % boron and the balance nickel. Alternatively, a sintered nickel-based alloy article comprises 12-20 wt. % chromium, 5-11 wt. % iron, 0.5-2 wt. % manganese, 0-2 wt. % silicon, 0-1 wt. % copper, 0-2 wt. % carbon, 0-5 wt. % boron and the balance nickel. A sintered nickel-based alloy article can comprise 3-27 wt. % chromium, 0-10 wt. % silicon, 0-10 wt. % phosphorus, 0-10 wt, % iron, 0-2 wt. % carbon, 0-5 wt. % boron and the balance nickel. A sintered nickel-based alloy article can also incorporate phosphorus, silver, zinc, vanadium and/or other elements as alloying elements.

Moreover sintered cobalt-based alloy articles derived from powder alloy carried in the sheet can have compositional parameters selected from Table IX.

TABLE IX

Cobalt-based sintered alloy

| Element | Amount (wt. %) |
|---|---|
| Chromium | 5-35 |
| Tungsten | 0-35 |
| Molybdenum | 0-35 |
| Nickel | 0-20 |
| Iron | 0-25 |
| Manganese | 0-2 |
| Silicon | 0-5 |
| Vanadium | 0-5 |
| Carbon | 0-4 |
| Boron | 0-5 |
| Cobalt | Balance |

In some embodiments, sintered cobalt-based alloy articles derived from powder alloy of the sheet have compositional parameters selected from Table X.

TABLE X

Co-based sintered alloy

| Co-Based Alloy Cladding | Compositional Parameters (wt. %) |
|---|---|
| 1 | Co—(15-35)%Cr—(0-35)%W—(0-20)%Mo—(0-20)%Ni—(0-25)%Fe—(0-2)%Mn—(0-5)%Si—(0-5)%V—(0-4)%C—(0-5)%B |
| 2 | Co—(20-35)%Cr—(0-10)%W—(0-10)%Mo—(0-2)%Ni—(0-2)%Fe—(0-2)%Mn—(0-5)%Si—(0-2)%V—(0-0.4)%C—(0-5)%B |
| 3 | Co—(5-20)%Cr—(0-2)%W—(10-35)%Mo—(0-20)%Ni—(0-5)%Fe—(0-2)%Mn—(0-5)%Si—(0-5)%V—(0-0.3)%C—(0-5)%B |
| 4 | Co—(15-35)%Cr—(0-35)%W—(0-20)%Mo—(0-20)%Ni—(0-25)%Fe—(0-1.5)%Mn—(0-2)%Si—(0-5)%V—(0-3.5)%C—(0-1)%B |
| 5 | Co—(20-35)%Cr—(0-10)%W—(0-10)%Mo—(0-1.5)%Ni—(0-1.5)%Fe—(0-1.5)%Mn—(0-1.5)%Si—(0-1)%V—(0-0.35)%C—(0-0.5)%B |
| 6 | Co—(5-20)%Cr—(0-1)%W—(10-35)%Mo—(0-20)%Ni—(0-5)%Fe—(0-1)%Mn—(0.5-5)%Si—(0-1)%V—(0-0.2)%C—(0-1)%B |

Sintered cobalt-based alloy of an article described herein can have chromium-rich carbide particles, molybdenum carbides, tungsten carbides, other carbides or hard intermetallic phase (Laves phase) present in the microstructure or can be a solution-type alloy in which alloying elements diffuse into the cobalt matrix. Alternatively, sintered cobalt-based alloy of an article can demonstrate a microstructure free or substantially free of such carbide particles or intermetallic phase, wherein alloying elements remain in solid solution without phase separation or precipitation during solidification.

Powder alloy carried by the sheet can be provided in pre-alloyed form having parameters for producing freestanding sintered nickel-based alloy and sintered cobalt-based alloy articles of desired composition. In some embodiments, pre-alloyed powders can be used to produce any of the freestanding sintered nickel-based or sintered cobalt-based alloy articles described above. For example, in some embodiments, pre-alloyed powder carried by the sheet can have compositional parameters selected from Table VIII, IX or X herein. Further, pre-alloyed nickel-based powders for use in methods described herein are commercially available under the HASTELLOY®, INCONEL® and/or BALCO® trade designations. Pre-alloyed cobalt-based powders for use in methods described herein are commercially available under the trade designations STELLITE®, TRIBALOY®, HAYNES®, MEGALLIUM® and/or other trade designations.

Powder metal or powder alloy of the sheet can have any particle size not inconsistent with the objectives of the present invention. In some embodiments, powder metal or powder alloy has an average particle size of less than 200 μm. For example, in one embodiment, powder metal or alloy has an average particle size less than 55 μm. Further, powder metal or alloy can demonstrate bi-modal or multi-modal size distributions. Powder metal or powder alloy can be combined with organic binder in the fabrication of a cloth-like sheet as described above.

After positioning over a surface of the temporary substrate, the sheet comprising organic binder and powder metal or powder alloy is heated to provide the sintered metal or sintered alloy article. Organic binder of the sheet is burned off or otherwise decomposed during the heating process. The temporary substrate and sheet comprising organic binder and powder metal or powder alloy can be heated in vacuum or under inert or reducing atmosphere. Further the substrate and powder metal or powder alloy can be heated to a temperature and for a time period sufficient to sinter the metal or alloy into an article of freestanding form. The resulting sintered metal or sintered alloy article, in some embodiments, is fully dense or substantially fully dense.

The sintered metal or sintered alloy article is cooled and subsequently removed from the substrate. As described herein, the metal or alloy, in some embodiments, does not substantially interact with the temporary substrate during sintering operations, thereby facilitating separation of the sintered metal or sintered alloy article from the temporary substrate. In some embodiments, the sintered metal or sintered alloy article is in near-net shape form when removed from the temporary substrate.

In contrast to articles fabricated by prior techniques such as pre-forming by powder pressing, extrusion or injection molding followed by sintering, articles produced according to methods described herein are not subject to dimensional and/or geometrical limitations imposed by tooling or dies required in prior powder processes. For example, in some embodiments, a freestanding sintered metal or alloy article of complex shape and thickness or wall thickness of less than 0.5 mm can be formed by methods described herein. Further, a sintered metal or alloy sheet produced according to methods described herein can have at least one lateral dimension in excess of 500 mm or in excess of 1000 mm while demonstrating a thickness less than 1 mm. The ability to produce alloy articles of such dimensions according to methods described herein is particularly useful since many alloys are not mechanically workable, even at high temperature. Cobalt-based alloys containing carbide particles or intermetallic particles, for example, are not suited for mechanical working into articles of thin cross-section and large lateral dimension.

In some embodiments, freestanding metallic articles fabricated according to methods described in this Section II are near-net shape. As described herein, production of near-net shape freestanding metallic articles can be facilitated by shaping the flexible sheet comprising the organic binder and the hard particles. The flexible sheet, for example, can be subjected to shape-forming operation(s) wherein the sheet is provided a shape or form reflecting the net shape and size of the free-standing metallic article. Shape-forming operations can include, but are not limited to, die cutting, stamping and punching.

Further, a freestanding sintered metal or sintered alloy article can be coated with one or more refractory materials to enhance abrasion, erosion, corrosion or other properties. For example, a freestanding sintered metal or alloy article can be coated with diamond, diamond-like carbon or ceramic material(s) by CVD, PVD, thermal spray or other coating methods. In some embodiments, a freestanding sintered metal or alloy article is coated with a metal or alloy composition. Such a metal or alloy coating can be operable for brazing the freestanding sintered metal or alloy article to one or more structural components. Alternatively, a freestanding sintered metal or alloy article described herein can be coated with epoxy or other organic material for bonding with other structural components.

Example 1

A free standing composite tubular article was produced according to a method described herein as follows. Tungsten carbide powder (40% by volume 2 to 5 microns size particles and 60% by volume-325 mesh size particles) was mixed with 6% by volume of PTFE. The mixture was mechanically worked to fibrillate PTFE and trap the tungsten carbide particles, thus making a cloth-like flexible abrasive carbide sheet as fully described in U.S. Pat. No. 4,194,040. A braze metal filler powder with composition of 79-84% nickel, 13-19% chromium and 2-5% boron by weight was mixed with 6% by volume of PTFE to form another cloth-like braze sheet, similar to that of tungsten carbide sheet set forth above.

The cloth-like carbide flexible sheet was applied to a cylindrical graphite bar on the outer diameter surface, which was pre-coated with a layer of ceramic powder like hexagonal boron nitride, followed by gluing the braze filler sheet in place over the tungsten carbide sheet. The sample was then debindered and heated in a vacuum furnace to 1100° C.-1160° C. for approximately 15 minutes to 4 hours during which the braze preform melted and infiltrated in the tungsten carbide sheet. After cooling, the cylindrical graphite bar was released to provide a substantially fully densified composite tube of about 1.5 mm in wall thickness. FIG. 1 is the picture of the composite tube component.

Example 2

Figure 2:
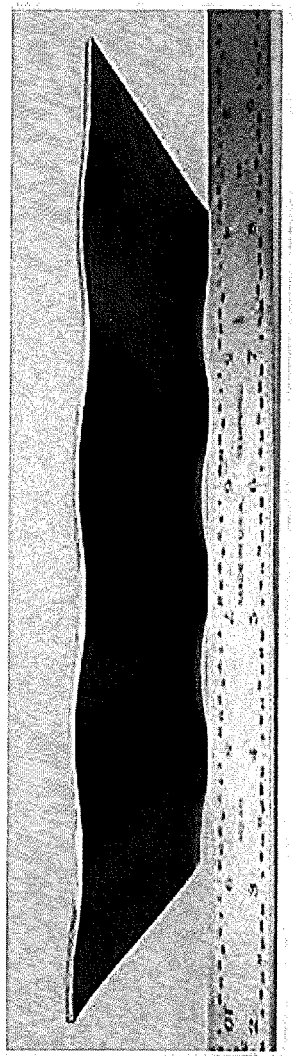
FIG. 2 illustrates a freestanding metallic article produced according to one embodiment of a method described herein.

An alloy sheet of waving contour was produced according to a method described herein as follows. −270 mesh STELLITE® 12 alloy powder or alloy powder with a composition of 28-32 wt. % chromium, 6-10 wt. % tungsten, 1-2 wt. % carbon, 0.2-0.5 wt. % boron, up to 4 wt. % nickel, up to 4 wt. % iron, up to 3 wt. % silicon, and up to 2% molybdenum was blended with 6 vol. % PTFE and was mechanically worked to fibrillate PTFE and trap the alloy particles, thus making a cloth-like flexible sheet. The cloth-like flexible sheet was placed on a graphite substrate with waving surface contour, which was pre-coated with ceramic powder like alumina, followed by debindering and heating in a vacuum furnace to a temperature of 1160-1200° C. and holding for 20 minutes to 2 hours to provide a substantially fully dense sheet of waving contour. FIG. 2 shows the alloy sheet of waving contour having composition within the range of STELLITE® 12 alloy. An advantage of this method described herein is its simplicity to make the sheet component of complex contour, large size and thin cross-section.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A method of making a freestanding metallic article comprising:
    providing a temporary substrate;
    disposing over a surface of the temporary substrate a flexible sheet comprising organic binder and powder nickel-based alloy;
    heating the sheet comprising the organic binder and powder nickel-based alloy to provide a sintered nickel-based alloy article comprising 12-20 wt. % chromium, 5-11 wt. % iron, 0.5-2 wt. % manganese 0-2 wt. % silicon, 0-1 wt. % copper, 0-2 wt. % carbon, 0-5 wt. % boron and the balance nickel; and
    separating the sintered nickel-based alloy article from the temporary substrate.

2. The method of claim 1, wherein the organic binder comprises one or more polymeric materials.

3. The method of claim 1, wherein the sintered nickel-based alloy article has a thickness of 100 µm to 20 mm.

4. The method of claim 1, wherein the sintered nickel-based alloy article is near-net-shape.

5. The method of claim 1, wherein the temporary substrate is reusable.

6. The method of claim 1, wherein the sintered nickel-based alloy article has a wall thickness less than 0.5 mm.

7. The method of claim 1, wherein the temporary substrate is formed of a material selected from the group consisting of hexagonal boron nitride, alumina, silica, silicon carbide, zirconia, magnesium oxide and graphite coated with hexagonal boron nitride.

8. The method of claim 1, wherein the temporary substrate comprises graphite.

9. The method of claim 1, wherein the temporary substrate comprises hexagonal boron nitride or graphite coated with hexagonal boron nitride.

10. The method of claim 1, wherein the powder nickel-based alloy has an average particle size less than 200 µM.

11. The method of claim 1, wherein the powder nickel-based alloy has an average particle size less than 55 µm.

12. The method of claim 1, wherein the powder nickel-based alloy has a bimodal or multi-modal particle size distribution.

13. The method of claim 1, wherein the sintered nickel-based alloy article has at least one lateral dimension in excess of 500 mm and a thickness less than 1 mm.

14. The method of claim 1, wherein the sintered nickel-based alloy article is fully dense.

15. The method of claim 1 further comprising coating the sintered nickel-based alloy article with a refractory material.

* * * * *